(12) United States Patent
Elvesjö et al.

(10) Patent No.: US 9,213,404 B2
(45) Date of Patent: Dec. 15, 2015

(54) GENERATION OF GRAPHICAL FEEDBACK IN A COMPUTER SYSTEM

(75) Inventors: John Elvesjö, Stockholm (SE); Anders Olsson, Stockholm (SE); Johan Sahlén, Uppsala (SE)

(73) Assignee: TOBII TECHNOLOGY AB, Danderyd (SE)

( * ) Notice: Subject to any disclaimer, the term of this patent is extended or adjusted under 35 U.S.C. 154(b) by 1185 days.

(21) Appl. No.: 12/162,694

(22) PCT Filed: Jan. 17, 2007

(86) PCT No.: PCT/SE2007/050024
§ 371 (c)(1),
(2), (4) Date: Feb. 10, 2009

(87) PCT Pub. No.: WO2007/089198
PCT Pub. Date: Aug. 9, 2007

(65) Prior Publication Data
US 2009/0315827 A1 Dec. 24, 2009

Related U.S. Application Data

(60) Provisional application No. 60/764,712, filed on Feb. 2, 2006.

(30) Foreign Application Priority Data

Feb. 1, 2006 (SE) ...................................... 0600208

(51) Int. Cl.
G06F 3/033 (2013.01)
G09G 5/08 (2006.01)
G06F 3/01 (2006.01)

(52) U.S. Cl.
CPC ...................................... G06F 3/013 (2013.01)

(58) Field of Classification Search
CPC .................................................... G06F 3/013
USPC ................... 345/156, 157; 715/862
See application file for complete search history.

(56) References Cited

U.S. PATENT DOCUMENTS 5,367,315 A 11/1994 Pan
5,617,312 A 4/1997 Iura et al.
(Continued)

FOREIGN PATENT DOCUMENTS

EP 1335270 A1 8/2003
JP 09081307 3/1997
(Continued)

OTHER PUBLICATIONS

Matsumoto et al., An Algorithm for Real-Time Stereo Vision Implementation of Head Pose and Gaze Direction Measurements, Mar. 2000, Proceedings of IEEE Fourth International Conference on Automatic Face and Gesture Recognition, pp. 499-505.
(Continued)

*Primary Examiner* — Kumar Patel
*Assistant Examiner* — Insa Sadio
(74) *Attorney, Agent, or Firm* — Moore & Van Allen PLLC; W. Kevin Ransom

(57) ABSTRACT

The present invention relates to control of a computer system, which includes a data processing unit, a display and an eye tracker adapted to register a user's gaze point with respect to the display. The data processing unit is adapted to present graphical information on the display, which includes feedback data reflecting the user's commands entered into the unit. The data processing unit is adapted to present the feedback data such that during an initial phase, the feedback data is generated based on an absolute position of the gaze point. An imaging device of the system is also adapted to register image data representing movements of a body part of the user, and to forward a representation of the image data to the data processing unit. Hence, during a phase subsequent to the initial phase, the data is instead generated based on the image data.

24 Claims, 2 Drawing Sheets

(56) References Cited

U.S. PATENT DOCUMENTS

| | | |
|---|---|---|
| 6,204,828 B1 * | 3/2001 | Amir et al. .................. 345/7 |
| 6,215,471 B1 * | 4/2001 | DeLuca ..................... 345/158 |
| 6,677,969 B1 | 1/2004 | Hongo |
| 2002/0171690 A1 * | 11/2002 | Fox et al. ................... 345/862 |
| 2004/0179715 A1 | 9/2004 | Nilsson et al. |
| 2004/0233160 A1 * | 11/2004 | Chincholle et al. ......... 345/156 |
| 2006/0033701 A1 * | 2/2006 | Wilson ...................... 345/156 |
| 2006/0082542 A1 * | 4/2006 | Morita et al. ............... 345/156 |

FOREIGN PATENT DOCUMENTS

| | | |
|---|---|---|
| JP | 10301675 | 11/1998 |
| JP | 2005352580 | 12/2005 |

OTHER PUBLICATIONS

International Search Report for PCT/SE2007/050024.
Extended European Search Report for PCT/SE2007/050024, Completed by the European Patent Office on Dec. 4, 2012, 7 Pages.

* cited by examiner

GENERATION OF GRAPHICAL FEEDBACK IN A COMPUTER SYSTEM

CROSS-REFERENCE TO RELATED APPLICATIONS

This application is the U.S. national phase of PCT Appln. No. PCT/SE2007/050024 filed Jan. 17, 2007 which claims priority to Swedish application SE 0600208-3 filed Feb. 1, 2006. This application also claims the benefit of U.S. provisional application Ser. No. 60/764,712 filed Feb. 2, 2006.

THE BACKGROUND OF THE INVENTION AND PRIOR ART

The present invention relates generally to presentation of information representing graphical feedback in response to user commands entered into a computer system. More particularly the invention relates to a computer system according to the preamble of claim 1 and a method according to the preamble of claim 12. The invention also relates to a computer program according to claim 22 and a computer readable medium according to claim 23.

Human computer interaction has been revolutionized by the graphical user interface (GUI). Namely, this interface provides an efficient means for presenting information to a user with a bandwidth which immensely exceeds any prior channel. Over the years the speed at which information can be presented has increased further through color screens, enlarged displays, intelligent graphical objects (e.g. pop-up windows), window tabs, menus, toolbars and sounds. During this time, however, the input devices have remained essentially unchanged, i.e. the keyboard and the pointing device (e.g. mouse, track ball or touch pad). In recent years, various handwriting devices have also been introduced (e.g. in the form of a stylus or a graphical pen). Nevertheless, while the output bandwidth has multiplied several times, the input ditto has been substantially unaltered. Consequently, a severe asymmetry in the communication bandwidth in the human computer interaction has occurred. In order to compensate for this, and render the data input more efficient and user friendly, various solutions have been proposed.

U.S. Pat. No. 5,367,315 describes a method and an apparatus for controlling cursor movements on a computer screen based on a user's eye and head movements. The system is activated by operating a designated key or switch. Thereafter, the user can position the cursor at any point on the screen by moving the eyes and head in the same manner as the conventional mouse. Specifically, infrared detectors determine the relative position of the user's head within a defined active area, so that the cursor's position on the screen depends on the head's position within the active area. The user's eyes are here primarily used as light reflectors to determine changes in the eye position, and thus indirectly to reveal variations in the head positioning within the active area. Thus, a relationship between the eyes/head position and the cursor position is established.

U.S. Pat. No. 6,215,471 discloses a vision pointer method and apparatus, wherein a user controls the movements of a pointer on a screen by means of a corresponding rotation or movement of a visually identifiable characteristic, such as a facial feature. Moreover, by modifying a changeable visual characteristic, e.g. closing an eye, the user may generate control signals representing mouse clicks and similar functions. Analogous to the solution above, there is also here a close relationship between the positioning of the visually identifiable characteristic and the pointer position on the screen.

U.S. Pat. No. 6,204,828 reveals a computer-driven system for assisting an operator in positioning a cursor on a screen. Here, the system calculates the operator's gaze position on the screen, and initially places the cursor within a gaze area identified by this position. A mechanical input device, e.g. a mouse or a keyboard, is then used to control the cursor from the initial position to an intended end position on the screen.

The first two solutions above are problematic because by employing these strategies it may be difficult for the user, who perhaps is a handicapped person, to control his/her head or gaze with sufficiently high precision to position the cursor at the desired place on the screen. Furthermore, even if the user is capable of controlling his/her body with very high precision, various imperfections in the tracking equipment may introduce measurement errors when registering the eyes/head position and the gaze point respectively, so that it still becomes difficult, or at least wearying to achieve the intended result. The last solution is an improvement in this respect, since here the user can compensate for any errors in gaze position estimations when manipulating the mechanical input device. Nevertheless, operation of such a mechanical device is associated with other problems, for instance related to fatigue, repetitive strain injuries etc. Moreover, a mechanical input device, such as a conventional mouse, is relatively slow and requires a certain operating space, either on the desktop or on a device surface (in the case of a laptop). Sometimes, no such space is available, or providing the required space is problematic.

SUMMARY OF THE INVENTION

The object of the present invention is therefore to offer a solution, which alleviates the above problems and thus provides a user friendly and ergonomically appropriate means to control a computer system with high precision, and in a highly efficient manner.

According to one aspect of the invention, the object is achieved by the initially described computer system for displaying information, wherein the system includes at least one imaging device, which is adapted to register image data representing the movements of the body part. The at least one imaging device is adapted to forward a representation of the image data to the data processing unit, which, in turn, is adapted to present the feedback data in such a manner that during an initial phase, the data is generated based on an absolute position of the gaze point; and during a phase subsequent to the initial phase, the data is generated based on the image data.

This system is advantageous because of its speedy response and very intuitive user interface. In the initial phase, the feedback data can be presented in relatively close proximity to a display area to which the user's gaze is actually directed. The proposed subsequent phase allows the user to fine position the feedback data with respect to the initial position by moving a selected body-part, and thus produce control commands reflecting a relative movement. This both provides high flexibility and a large freedom in terms of the body-part used.

According to a preferred embodiment of this aspect of the invention, the data processing unit is adapted to receive a user-generated start command, and instigate the initial phase in response to a reception of the start command. Thus, an unambiguous timing of the feedback data presented in response to the gaze point is obtained. This, in turn, enhances the quality of the user interface. Depending on the implementation and the user preferences, the start command may be generated by activating a mechanical input member, uttering a voice command, by locating the gaze point within a particular area of the display during a threshold dwell time, or by moving the gaze point according to a predefined movement sequence, e.g. a so-called saccade.

According to another preferred embodiment of this aspect of the invention, the data processing unit is adapted to instigate the subsequent phase after a predetermined duration of the initial phase. The initial phase can normally be made relatively short, say 1 to 2 seconds (or even substantially less). Thereafter, it may be advantageous if the subsequent phase starts automatically.

According to an alternative embodiment of this aspect of the invention, the data processing unit is instead adapted to receive a user-generated trigger command, and to instigate the subsequent phase in response to a received trigger command. Hence, the user can choose the point in time when he/she considers that it is appropriate to start controlling the feedback data in response to the movements of said body part. For example, the system may preferably include means adapted to receive the user-generated trigger command in the form of: activation of a mechanical input member, a voice command, location of the gaze point within a particular area of the display during a threshold dwell time or a predefined movement sequence completed by the gaze point (e.g. a saccade). Namely, thereby, the efficiency of the user interaction with the system can be further improved.

According to yet another preferred embodiment of this aspect of the invention, the feedback data represents a graphical pointer. Moreover, the data processing unit is adapted to during the initial phase, position the pointer on the display at a start location being reflected by the gaze point, for instance at a particular distance from an estimated position for the gaze point. During the subsequent phase, the data processing unit is adapted to move the pointer from the start location in response the image data that represents the moving body part. Preferably, the data processing unit is adapted to interpret the image data as representing a relative repositioning of the graphical pointer from the start location in such a manner that a particular movement of the body part causes a predetermined repositioning of the graphical pointer. Hence, by moving the body part while viewing the display, the user may control the pointer to be gradually moved from the start location, as he/she desires.

According to still another preferred embodiment of this aspect of the invention, the data processing unit is adapted to cause the display to repeatedly update the presented feedback data in response to the image data during the subsequent phase. Hence, for example, the above-mentioned gradual repositioning is facilitated.

According to a further preferred embodiment of this aspect of the invention, the at least one imaging device is included in the eye tracker. Hence, the imaging device and the eye tracker may use a common camera unit. Of course, this is advantageous with respect to cost efficiency and the compactness of the design.

According to another preferred embodiment of this aspect of the invention, the graphical information includes a first fraction representing non-feedback data and a second fraction representing the feedback data. Moreover, the data processing unit is adapted to cause presentation of the second fraction at a confirmation position on the display, where the location of the confirmation position depends on a content of the first fraction. This means that the feedback data behavior may be adapted to the current screen contents, as well as the locality interrelationship between this content and the feedback data. For example, feedback data in the form of a graphical pointer may have a first appearance and/or behavior when located over, or near, a manipulable GUI object, and a second appearance and/or behavior when located in a display area containing no such objects.

According to another aspect of the invention the object is achieved by the method as initially described, wherein image data is registered, which represents the movements of the body part.

The feedback data is presented, such that during an initial phase, the feedback data is generated based on an absolute position of the gaze point. During a phase subsequent to the initial phase, the feedback data is instead generated based on said image data.

The advantages of this method, as well as the preferred embodiments thereof, are apparent from the discussion hereinabove with reference to the proposed computer system.

According to a further aspect of the invention the object is achieved by a computer program, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above proposed method.

Generally, one bonus effect attainable by the invention is that the image-based data generated during the subsequent phase may be used to automatically calibrate the eye tracker. Namely, by studying this data conclusions can be drawn as to how the eye tracker should be adjusted in order to minimize any errors between the gaze point registered by the eye tracker and the user's estimated actual gaze point.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
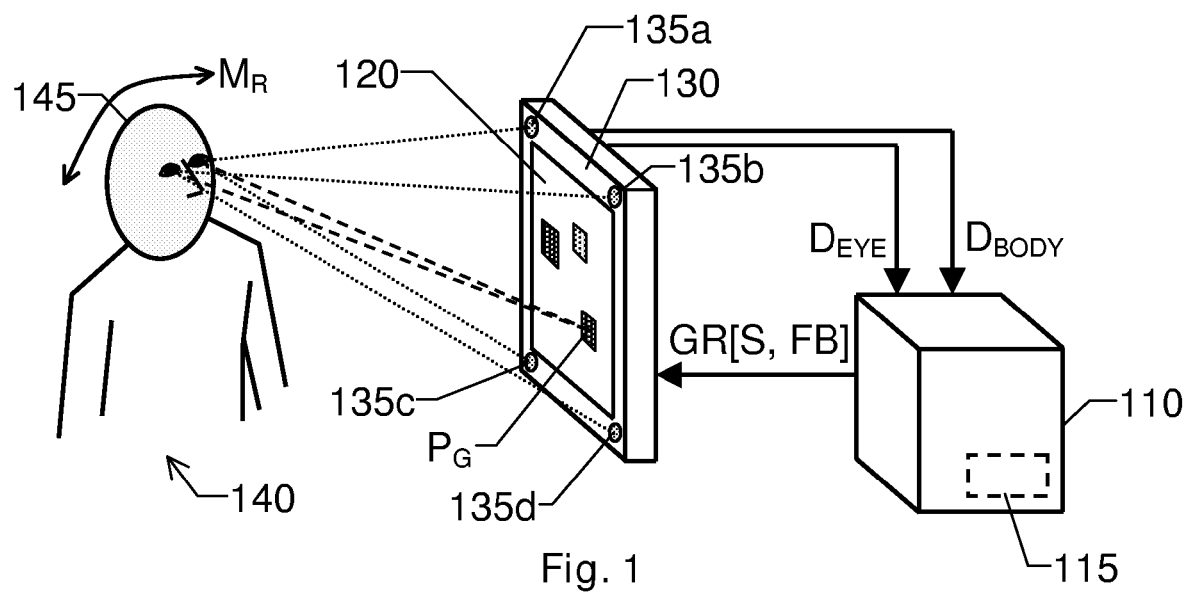
FIG. 1 shows an overview picture of user interacting with the proposed computer system.

FIG. 1 shows an overview picture of a typical use-case according to the invention. Here, a user 140 controls a computer system by means of eye movements and movements of a particular body part.

The system includes a data processing unit 110, a display 120 and an eye tracker 130, which is either integrated in the display 120 (as shown in the figure), or a separate unit. The eye tracker 130 is adapted to register the user's 140 gaze point $P_G$ with respect to the display 120. To this aim, the eye tracker 130 is preferably equipped with one or more imaging devices 135a and 135b. It is generally advantageous if the eye tracker 130 also includes, or is associated with, one or more light sources 135c and 135d for emitting light, e.g. in the infrared or near infrared spectrum, towards the user 140. The eye tracker 130 is adapted to produce eye tracking data $D_{EYE}$ describing the gaze point $P_G$, and to forward this data $D_{EYE}$ to the data processing unit 110.

The data processing unit 110 is adapted to forward graphical information GR[S, FB] for presentation on the display 120. According to the invention, at least some of this information GR[S, FB] represents feedback data FB generated in response to user commands entered into the data processing unit 110. These commands are generated based on either the gaze point $P_G$, or on movements $M_R$ of a body part 145 of the user 140. The system may be calibrated to detect the movements $M_R$ of essentially any body part 145. However it is preferable that the body part is comparatively visually distinct, such as the nose, the mouth, the entire head, the hand, the lower arm etc. It is advantageous to select the pair of eyes (i.e. an image segment including the user's 140 both eyes) to represent a body part 145 relative to which the eyes are fixated (e.g. the head). Namely, in this case, the eye tracker 130, which is optimized to register various eye related characteristics can be used also to detect the movements of said body part 145.

In any case, the system includes an imaging device that is adapted to register image data $D_{BODY}$ representing the movements $M_R$ of the body part 145. As mentioned above, this imaging device may be identical to one or more devices 135a and/or 135b included in the eye tracker 130. The imaging device is further adapted to forward a representation of the image data $D_{BODY}$ to the data processing unit 110. Depending on the processing capabilities of the imaging device, this means that the unit 110 receives either raw image data (essentially as registered by the imaging device), or a processed version of the image data. In the latter case, the imaging device may provide the data processing unit 110 with a signal, which contains relevant position/time information, motion vectors etc.

The data processing unit 110 is adapted to receive both the eye tracking data $D_{EYE}$ and the representation of the image data $D_{BODY}$. Based on this data, the unit 110 presents the feedback data FB such that: during an initial phase, the data FB is generated based on an absolute position of the gaze point $P_G$; and during a phase subsequent to the initial phase, the data FB is generated based on the image data $D_{BODY}$. Preferably, the data processing unit 110 includes, or is associated with, a memory unit 115 that is adapted to store software for controlling the unit 110 to execute this process.

Figure 2:
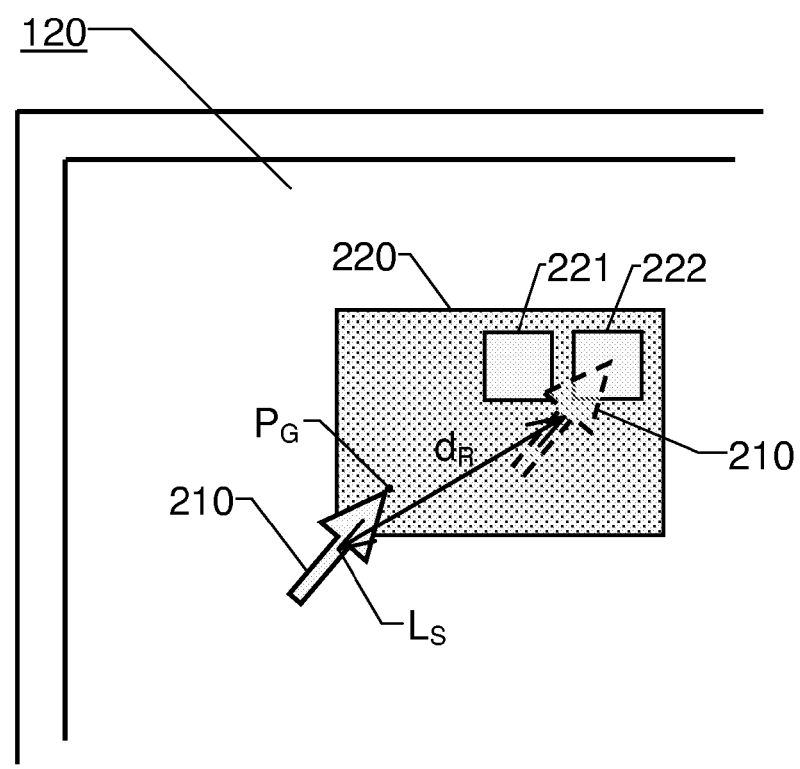
FIG. 2 shows a detail view of the display in FIG. 1 according to a preferred embodiment of the invention.

Turning now to FIG. 2, we see a more detailed view of the display 120 in FIG. 1. Naturally, the feedback data FB may represent many different forms of graphical information, such as highlighting of GUIs, activation of so-called applets and so on.

According to one embodiment of the invention, the feedback data FB represents a graphical pointer 210. In this embodiment, the data processing unit 110 is adapted to, during the initial phase, position the pointer 210 on the display 120 at a start location $L_S$, which is defined by the gaze point $P_G$. (i.e. a display area to which the eye tracker 130 has estimated the user's gaze to be directed). Thus, the pointer 210 the start location $L_S$ may overlap the gaze point $P_G$, or be a position having a particular locality relative to the gaze point $P_G$.

In the example illustrated in FIG. 2, the display 120 also shows graphics in the form of a primary object 220, which in turn, includes first and second on-screen buttons 221 and 222 respectively. Here, we assume that the user 140 intends to activate the second on-screen button 222, and therefore is interested in moving the pointer 210 over this graphical object. Hence, the actual gaze point may be located in the center of the primary object 220 (i.e. approximately at $P_G$).

In order to place the pointer 210 at the desired position, during the subsequent phase, the user 140 moves $M_R$ the particular body part, such as his/her head 145. The imaging device registers this movement $M_R$, and produces corresponding image data $D_{BODY}$, a representation of which is forwarded to the data processing unit 110. This unit 110, in turn, causes such feedback data FB to be presented on the display 120 that the pointer 210 moves from the start location $L_S$ (i.e. the pointer 210 moves in response the image data $D_{BODY}$).

According to one preferred embodiment of the invention, the data processing unit 110 is adapted to interpret the representation image data $D_{BODY}$ to represent a relative repositioning $d_R$ of the graphical pointer 210 from the start location $L_S$ in such a manner that a particular movement $M_R$ of the body part 145 causes a predetermined repositioning of the graphical pointer 210. Namely, from a motoric point-of-view, this is a very intuitive motion process for the user 140. Of course, here, any relationship between the movement $M_R$ and the repositioning $d_R$ is conceivable. Many times, a purely linear relationship may be desirable. However, in other applications a non-linear relationship may be more efficient. In any case, it is advantageous if a general rightwards movement of the body part 145 causes the pointer 210 to move rightwards over the display, a general leftwards movement of the body part 145 causes the pointer 210 to move leftwards over the display, and so on. Naturally, the data processing unit 110 can also be adapted to distinguish more complex movements $M_R$, so that the pointer 210 can be moved in arbitrary direction across the display 120 in response to the body-part movement.

Furthermore, it is advantageous if the data processing unit 110 is adapted to cause the display 120 to repeatedly update the presented feedback data FB in response to the image data $D_{BODY}$ during the subsequent phase. Preferably, such updating is performed at relatively high frequency, e.g. 10-30 times per second. Thereby, the feedback data FB can describe a graphical pointer 210 that appears to move continuously in response to the movements $M_R$.

According to one preferred embodiment of the invention, the graphical information GR[S, FB] includes a first fraction S representing non-feedback data and a second fraction representing FB the feedback data. Referring to the example shown in FIG. 2, the primary object 220, the first on-screen button 221 and the second on-screen button 222 may constitute data included in the first fraction S, whereas the pointer 210 is included in the second fraction FB. In this embodiment, the data processing unit 110 is adapted to cause presentation of the feedback data FB included in the second data fraction at a confirmation position on the display 120, where the location of the confirmation position depends on the contents of the first fraction S.

For example, when located over any of the on-screen buttons 221 or 222, the feedback data FB may represent the pointer 210, so that these buttons can be manipulated by generating a confirmation command when the pointer 210 is placed here. However, whenever located over a text window, the feedback data FB may instead represent a highlighting of this window. Naturally, according to the invention, many alternative forms of visual guidance information can be presented. The type, or characteristics of, the feedback data FB may also depend on the contents of the first fraction S. Hence, when located over a text window, the feedback data FB may represent a cursor symbol; whereas when located over, or sufficiently near, other kinds of manipulable GUI objects the feedback data FB may represent a pointer, or similar graphical symbol.

Furthermore, the relationship between the gaze point $P_G$ and the positioning of the feedback data FB may be non-linear. For example, one or more GUI objects on the display 120 can be associated with a "field of gravity". This may imply that, if the gaze point $P_G$ is not located on any GUI object, however within a particular distance from a first GUI object, the feedback data FB (e.g. in the form of a graphical pointer 210) is presented at the first GUI object.

According to one embodiment of the invention, the above-mentioned initial phase is started manually by the user 140. Therefore, the data processing unit 110 is adapted to receive a user-generated start command. The unit 110 is further adapted to instigate the initial phase in response to reception of such a start command. The proposed system comprises at least one means, which is adapted to receive the start command. Preferably, the start command is generated by activating a mechanical input member (such as a key, a button, a switch, a pedal etc.), uttering a voice command, locating the gaze point $P_G$ within a particular area of the display 120 (e.g. proximate to the pointer's 210 current position, or over an alternative manipulable GUI object) during a threshold dwell time, and/or moving the gaze point $P_G$ according to a predefined movement sequence (e.g. a saccade from/to a particular GUI object).

Normally, it is preferable that the initial phase is comparatively short, i.e. having duration in the order of 0.1 to 2 seconds. A very short initial phase may be preferable because then the feedback data FB will be perceived to appear "instantaneously" in response to where the user's 140 gaze is directed. In many applications, it is further desirable if the subsequent phase starts automatically after completion of the initial phase. To this aim, according to one embodiment of the invention, the data processing unit 110 is adapted to instigate the subsequent phase a predetermined time after commencement of the initial phase.

For example, the user 140 can instigate the initial phase by depressing a designated key on a keyboard associated with the data processing unit 110. In connection with depressing the key the user 140 places his/her gaze point $P_G$ at a desired location on the display 120. Shortly thereafter, the subsequent phase follows (automatically), and during this phase, the user 140 controls the data processing unit 110 by means of his/her body part movements $M_R$. Then, when the feedback data FB indicates that a desired input status has been attained, the user 140 releases the designated key to end the subsequent phase.

According to another embodiment of the invention, the subsequent phase is started manually. Hence, the data processing unit 110 is adapted to receive a user-generated trigger command, and to instigate the subsequent phase in response to reception of such a trigger command. Preferably, the trigger command is generated by activating a mechanical input member (such as a key, a button, a switch, a pedal etc.), uttering a voice command, locating the gaze point $P_G$ within a particular area of the display 120 (e.g. proximate to the pointer's 210 current position, or over an alternative manipulable GUI object) during a threshold dwell time, and/or moving the gaze point $P_G$ according to a predefined movement sequence (e.g. a saccade from/to a particular GUI object). Therefore, the system includes at least one means, which is adapted to receive the trigger command in at least one of these forms.

It is worth noting that, according to the invention, the user's 140 gaze point $P_G$ need not actually be located on the display 120 during the initial phase. Instead, during this phase, the gaze point $P_G$ may be directed towards a so-called off-screen button, i.e. software related control means being represented by an area outside the display 120 (e.g. on the display frame). Activation of such an off-screen button may cause feedback data FB (say in the form of a drop-down list) to be presented on the display 120 (preferably proximate to the off-screen button identified by the gaze point $P_G$). Hence, during the subsequent phase, the user 140 can navigate through the drop-down list by performing adequate body part movements $M_R$. Off-screen buttons are desirable because they economize the screen surface.

Figure 3:
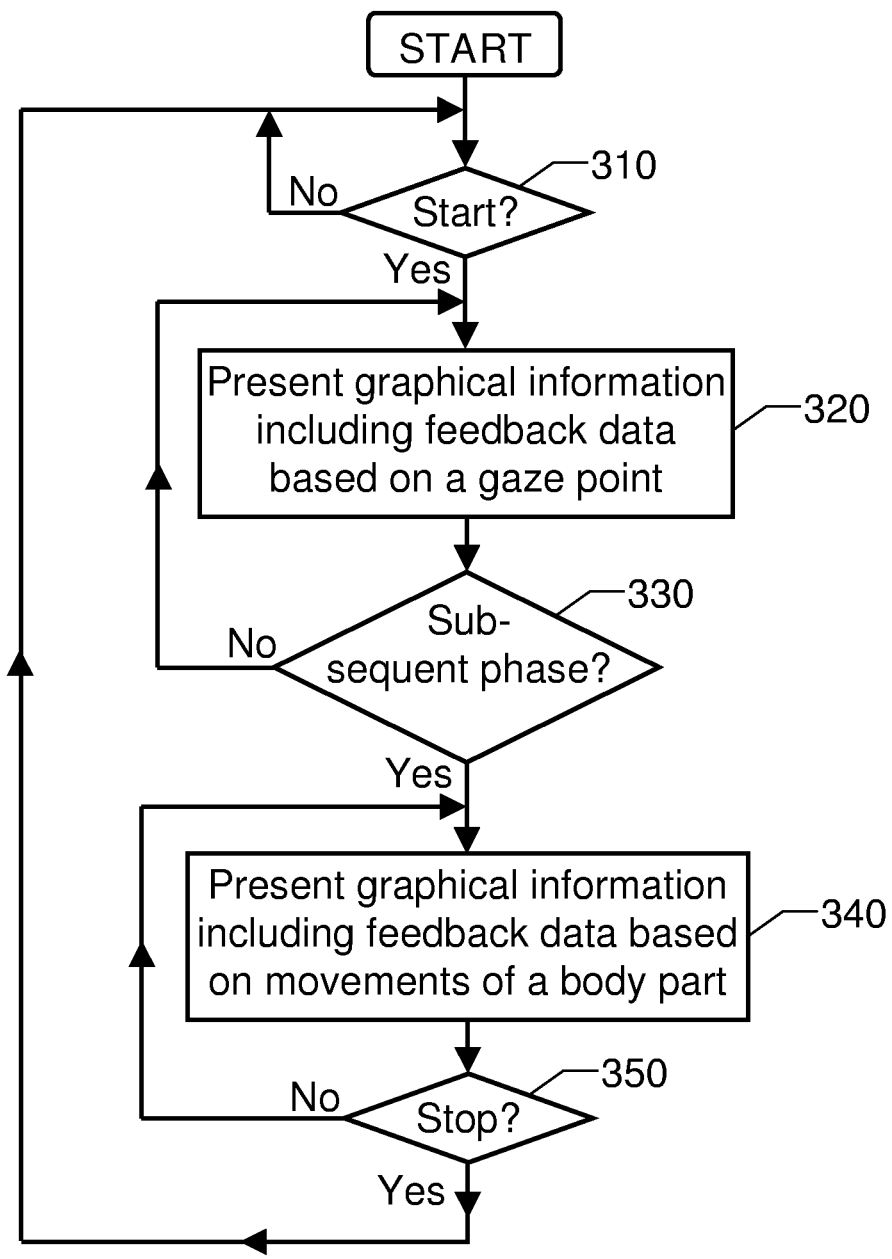
FIG. 3 illustrates, by means of a flow diagram, a general method for controlling a computer system according to the invention.

To sum up, the general method of controlling a computer system according to the invention will now be described with reference to the flow diagram in FIG. 3.

An initial step 310 investigates whether or not a start command has been received. Preferably, this command is user-generated according to what has been discussed above. If no such command is received, the procedure loops back and stays in the step 310, and otherwise a step 320 follows. The step 320 presents feedback data on a display, such that the feedback data is generated based on an absolute position of a user's gaze point with respect to the display.

Subsequently, a step 330 investigates whether or not a condition for initiating a subsequent phase has been fulfilled. As mentioned above, this condition may either be represented by a predetermined interval after commencing the initial phase executed in the step 320, or upon receipt of a trigger command. In any case, if the condition is not fulfilled, the procedure loops back to the step 320. Otherwise, a step 340 follows, which presents feedback data generated based on image data representing movements of a particular body part of the user.

Thereafter, a step 350 investigates whether or not a stop criterion is fulfilled. It is highly advantageous if a stop signal indicating fulfillment of the stop criterion is generated manually by the user. Namely, only the user knows when a certain operation being controlled in response to the movements of his/her body part has been completed. Hence, the stop signal may be generated by activating a mechanical input member (such as a key, a button, a switch, a pedal etc.), uttering a voice command, locating the gaze point $P_G$ within a particular area of the display 120 (e.g. proximate to the pointer's 210 current position, or over an alternative manipulable GUI object) during a threshold dwell time, moving the gaze point $P_G$ according to a predefined movement sequence (e.g. a saccade from/to a particular GUI object) and/or releasing a designated key.

If, in the step 350, the stop criterion is found to be fulfilled, the procedure loops back to the step 310. Otherwise, the procedure loops back to the step 340. Naturally, in connection with fulfillment of the stop criterion, the data processing unit may be adapted to execute one or more operations, for instance related to a manipulable GUI object selected, and possibly activated, via the above-described procedure.

All of the process steps, as well as any sub-sequence of steps, described with reference to the FIG. 3 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia.

The invention is not restricted to the described embodiments in the figures, but may be varied freely within the scope of the claims.

The invention claimed is:

1. A computer system comprising:
   a data processing unit adapted to present graphical information including feedback data on a display; and
   an eye tracker adapted to register both a user's gaze point with respect to the display and image data representing movements of the user's head, the registering of said movements of the user's head involving capturing image data representing at least one feature being fixated relative to the user's head; the data processing unit being adapted to generate the feedback data based on the gaze point of the user and the movements of the user's head, and to present the feedback data such that:
      during an initial phase, the feedback data is generated based on an absolute position of the gaze point detected by the eye tracker, wherein the feedback data, during the initial phase, is positioned on the display at a start location defined by the gaze point, the gaze point being where the eye tracker has estimated the user's gaze to be directed, and
      during a subsequent phase following the initial phase, the feedback data is generated based on the image data representing movements of the user's head, wherein, during the subsequent phase, the feedback data is moved from the start location determined in the initial phase to a new location on the display based on the image data representing movements of the user's head determined in the subsequent phase to thereby refine the position of the feedback data on the display based on the user's head movements as a refinement to the detection of the user's gaze point,
   wherein the initial phase is instigated in response to engagement by the user of an input member, and
   the eye tracker is adapted to register the user's gaze point in connection with engagement of the input member, and in response thereto the data processing unit is configured to cause feedback data to be presented on the display, which feedback data represents an estimated position for the gaze point of the user, thereafter the data processing unit is configured to initiate the subsequent phase automatically at a predetermined time after initiation of the initial phase, and end the subsequent phase in response to disengagement of said input member by the user.

2. The computer system according to claim 1, wherein the at least one feature being fixated relative to the user's head is the pair of eyes of the user; and said eye tracker comprises an imaging device that is configured to determine said movements of the user's head by registering positions for the pair of eyes of the user.

3. The computer system according to claim 1, wherein the data processing unit is adapted to interpret the image data to represent a relative repositioning of the feedback data from the start location in such a manner that a particular movement of the user's head causes a predetermined repositioning of the feedback data on the display.

4. The computer system according to claim 1, wherein the data processing unit is adapted to cause the display to repeatedly update the presented feedback data in response to the image data during the subsequent phase, wherein the update is at a frequency of 10 to 30 times per second such that the feedback data appears to move substantially continuously on the display in response to movement of the user's head in the subsequent phase.

5. The computer system according to claim 1, wherein the graphical information comprises a first fraction representing non-feedback data and a second fraction representing the feedback data, and the data processing unit is adapted to cause presentation of the second fraction at a confirmation position on the display, wherein the location of the confirmation position and a form in which the second fraction is displayed depend on a content of the first fraction.

6. The computer system according to claim 5, wherein the non-feedback data of the first fraction is an on-screen button, and wherein the feedback data of the second fraction is a graphic pointer, such that when the graphic pointer is positioned on the on-screen button, the on-screen button is shown as highlighted.

7. The computer system according to claim 5, wherein the non-feedback data of the first fraction is a text window, and wherein the feedback data of the second fraction is a graphic cursor, such that when the graphic cursor is positioned on the text window, the cursor highlights the text window.

8. The computer system according to claim 5, wherein the non-feedback data of the first fraction is a GUI object, wherein the feedback data of the second fraction is a graphic pointer or cursor, such that when the graphic pointer or cursor is located at a predetermined distance from the GUI object, the graphic pointer or cursor is automatically repositioned on the GUI object.

9. The computer system according to claim 1, wherein said eye tracker detects an eye gaze of the user indicating that the user is gazing at an off-screen button, wherein said processing unit, in the initial phase, is configured to display feedback data on the display in response to detecting that the user is gazing at the off-screen button.

10. The computer system according to claim 9, wherein said processing unit, in the initial phase, is configured to display second feedback data on the display in response to detecting that the user is gazing at the off-screen button, where the second feedback data is a drop-down list, and wherein said processing unit is configured, in the subsequent phase, to navigate through the drop-down list based on head position movements of the user.

11. The computer system according to claim 1, wherein the image data registered during the subsequent phase is used to automatically calibrate the eye tracker, so as to minimize errors between the gaze point registered by the eye tracker in the initial phase and an estimated actual gaze point of the user determined from the image data in the subsequent phase.

12. The computer system according to claim 1, wherein the predetermined time is up to 2.0 seconds in duration, and the data processing unit is configured to initiate the subsequent phase automatically at the predetermined time after initiation of the initial phase.

13. A method of controlling a computer system including a data processing unit, an eye tracker and a display, the method comprising:
presenting graphical information on the display;
registering, using the eye tracker, both a user's gaze point with respect to the display and image data representing movements of the user's head, the registering of movements of the user's head involving capturing image data representing at least one feature being fixated relative to the user's head;
generating feedback data based on the gaze point measured by the eye tracker and the movements of the at least one feature being fixed relative to the user's head, the feedback data being presented such that:
during an initial phase, the feedback data is generated based on an absolute position of the gaze point detected by the eye tracker, wherein the feedback data, during the initial phase, is positioned on the display at a start location defined by the gaze point, the gaze point being where the eye tracker has estimated the user's gaze to be directed toward, and
during a subsequent phase following the initial phase, the feedback data is generated based on the image data representing movements of the user's head, wherein, during the subsequent phase, the feedback data is moved from the start location determined in the initial phase to a new location on the display based on the image data representing movements of the user's head determined in the subsequent phase, to thereby refine the position of the feedback data on the display based on the user's head movements as a refinement to the detection of the user's gaze point;
instigating the initial phase in response to engagement of an input member by the user;
thereafter initiating the subsequent phase automatically at a predetermined time after initiation of the initial phase;
ending the subsequent phase in response to detecting disengagement of the input member by the user.

14. The method according to claim 13, wherein the at least one feature being fixed relative to the user's head is a pair of eyes that are used to determine movements of the user's head by registering positions for the pair of eyes.

15. The method according to claim 13, comprising interpreting the image data to represent a relative repositioning of the feedback data from the start location in such a manner that a particular movement of the user's head causes a predetermined repositioning of the feedback data on the display.

16. The method according to claim 13 further comprising causing the display to repeatedly update the presented feedback data in response to the image data during the subsequent phase, wherein the update is at a frequency of 10 to 30 times per second, such that the feedback data appears to move substantially continuously on the display in response to movement of the user's head in the subsequent phase.

17. The method according to claim 13, wherein the graphical information comprises a first fraction representing non-feedback data and a second fraction representing the feedback data, and the method comprises causing presentation of the second fraction at a confirmation position on the display, wherein the location of the confirmation position and a form in which the second fraction is displayed depend on a content of the first fraction.

18. The method according to claim 17, wherein the non-feedback data of the first fraction is an on-screen button, and wherein the feedback data of the second fraction is a graphic pointer, wherein said method comprises positioning the graphic pointer on the on-screen button in the subsequent phase and displaying the on-screen button as highlighted.

19. The method according to claim 17, wherein the non-feedback data of the first fraction is a text window, and wherein the feedback data of the second fraction is a graphic cursor, wherein said method comprises positioning the graphic cursor on one of the text window in the subsequent phase and displaying the text window as highlighted.

20. The method according to claim 17, wherein the non-feedback data of the first fraction is a GUI object, wherein the feedback data of the second fraction is a graphic pointer or cursor, wherein said method comprises, in the subsequent phase, automatically repositioning the graphic pointer or cursor on the GUI object when the graphic pointer or cursor is located at a predetermined distance from the GUI object.

21. The method according to claim 13 further comprising automatically calibrating the eye tracker using the image data registered during the subsequent phase, so as to minimize errors between the gaze point registered by the eye tracker in the initial phase and an estimated actual gaze point of the user determined from the image data in the subsequent phase.

22. The method according to claim 13, wherein, during an initial phase, the feedback data is generated in response to detecting that the user is gazing at an off-screen button.

23. The method according to claim 22, wherein generating the feedback data, in the initial phase, comprises displaying a drop-down list, and wherein, in the subsequent phase, the feedback data represents navigation through the drop-down list based on head position movements of the user.

24. The method according to claim 13, wherein the predetermined time is up to 2.0 seconds in duration, and initiating the subsequent phase comprises initiating the subsequent phase automatically at the predetermined time after initiation of the initial phase.

* * * * *